United States Patent
Mendieta Echevarria

(10) Patent No.: US 9,989,037 B2
(45) Date of Patent: Jun. 5, 2018

(54) VERTICAL AXIS WIND TURBINE WITH LOW VISUAL IMPACT

(71) Applicant: Federico Mendieta Echevarria, Getxo Vizcaya (ES)

(72) Inventor: Federico Mendieta Echevarria, Getxo Vizcaya (ES)

(*) Notice: Subject to any disclaimer, the term of this patent is extended or adjusted under 35 U.S.C. 154(b) by 0 days. days.

(21) Appl. No.: 15/102,739

(22) PCT Filed: Nov. 24, 2014

(86) PCT No.: PCT/ES2014/070863
§ 371 (c)(1),
(2) Date: Jun. 8, 2016

(87) PCT Pub. No.: WO2015/086872
PCT Pub. Date: Jun. 18, 2015

(65) Prior Publication Data
US 2016/0312770 A1    Oct. 27, 2016

(30) Foreign Application Priority Data

Dec. 13, 2013  (ES) .................................. 201331825

(51) Int. Cl.
*F03D 3/00* (2006.01)
*F03D 3/06* (2006.01)
(Continued)

(52) U.S. Cl.
CPC .......... *F03D 13/20* (2016.05); *E04B 1/34357* (2013.01); *E04H 12/187* (2013.01);
(Continued)

(58) Field of Classification Search
CPC .......... F03D 13/20; F03D 3/064; F03D 3/005; E04B 31/34357; E04H 12/187;
(Continued)

(56) References Cited

U.S. PATENT DOCUMENTS 4,087,202 A * 5/1978 Musgrove ............... F03D 3/061
                                                    416/117
4,191,507 A * 3/1980 DeBerg .................. F03D 3/067
                                                    416/117
(Continued)

FOREIGN PATENT DOCUMENTS

EP    2161394 A1    3/2010
GB    2249143 A     4/1992
(Continued)

OTHER PUBLICATIONS

International Search Report dated Feb. 5, 2015 for PCT/ES2014/070863.

*Primary Examiner* — Phi D A
*Assistant Examiner* — Omar F Hijaz
(74) *Attorney, Agent, or Firm* — Lucas & Mercanti, LLP

(57) ABSTRACT

Vertical axis wind turbine, indistinctly applicable in land or sea, the main characteristic of which is its low visual impact due to the collapse of its tower and rotor as required by environmental or meteorological conditions.

It is constituted by a structure that includes a base (3, 5), a plurality of supporting arms (10, 13), an elevation set (6, 7, 8) and a drive shaft (17) that acts on the generating elements (29) arranged at the base. Said structure supports a rotor (1) and its corresponding blades (2), attached by means of motorized shafts (20) that collapse and expand the blades (2) over the rotor (1).

Whenever the electric motor (6) winds the tensioning element (8) attached to two pairs of lower arms (10), they rotate at their base and intermediate point and raise, during their movement, the upper arms (13) and the drive shaft (17). The entirety of this structure is secured with braces (21, 24), which act on the upper and lower part of their corresponding arms (10, 13), achieving a safe collapse and expansion.

9 Claims, 7 Drawing Sheets

(51) Int. Cl.
*E04H 12/18* (2006.01)
*E04B 1/343* (2006.01)
*F03D 13/20* (2016.01)

(52) U.S. Cl.
CPC .............. *F03D 3/005* (2013.01); *F03D 3/064* (2013.01); *F05B 2240/214* (2013.01); *F05B 2240/218* (2013.01); *F05B 2240/9152* (2013.01); *F05B 2260/50* (2013.01); *Y02E 10/728* (2013.01); *Y02E 10/74* (2013.01)

(58) Field of Classification Search
CPC ................... Y02E 10/728; Y02E 10/74; F05B 2240/9152; F05B 2240/18; F05B 2240/214; F05B 2260/50
See application file for complete search history.

(56) References Cited

U.S. PATENT DOCUMENTS

| | | | |
|---|---|---|---|
| 6,665,990 B1 * | 12/2003 | Cody | E02D 27/42 405/244 |
| 8,813,455 B2 * | 8/2014 | Merrifield | E04C 3/02 135/144 |
| 2007/0175134 A1 | 8/2007 | Christenson | |
| 2010/0172759 A1 * | 7/2010 | Sullivan | F03D 3/06 416/41 |
| 2010/0226785 A1 * | 9/2010 | Livingston | E04H 12/10 416/244 R |
| 2010/0326004 A1 * | 12/2010 | Daas | B66C 23/70 52/646 |
| 2013/0216379 A1 * | 8/2013 | Tull De Salis | F03D 1/001 416/23 |
| 2014/0311085 A1 * | 10/2014 | Fernandez Gomez | E04H 12/12 52/745.18 |

FOREIGN PATENT DOCUMENTS

| | | | | |
|---|---|---|---|---|
| GB | 2427003 A | * | 12/2006 | ............... F03D 3/06 |
| GB | 2481418 A | | 12/2011 | |
| SU | 1546700 A1 | | 2/1990 | |
| WO | 2011105970 A2 | | 9/2011 | |

* cited by examiner

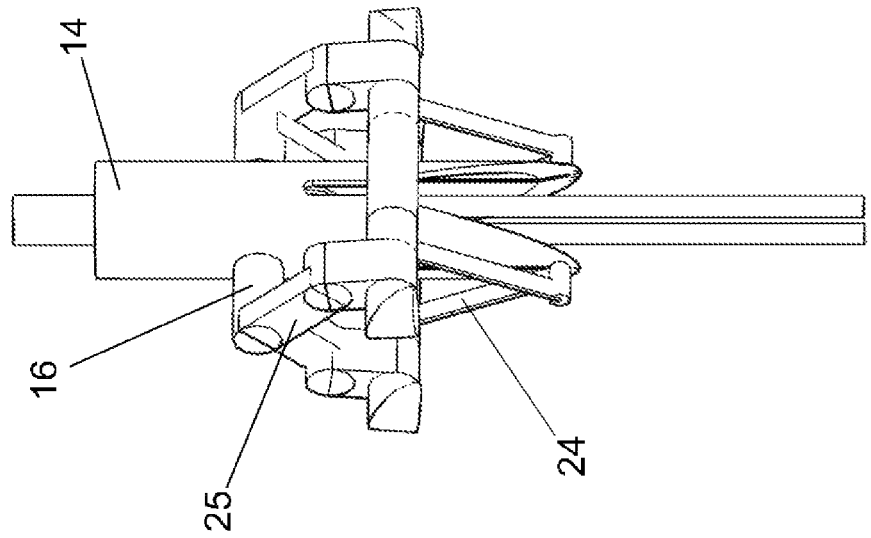
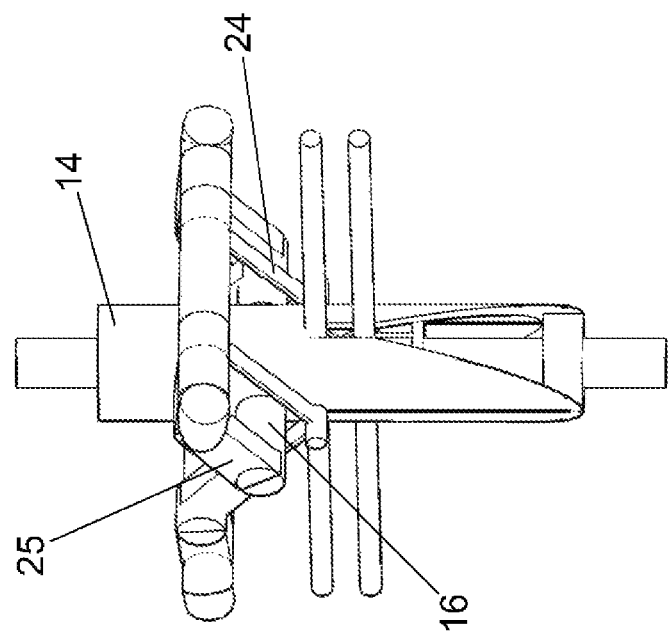
Fig. 5B
Fig. 5A

VERTICAL AXIS WIND TURBINE WITH LOW VISUAL IMPACT

CROSS REFERENCE TO RELATED APPLICATION

This Application is a 371 of PCT/ES2014/070863 filed on Nov. 24, 2014, which claims priority of Spanish Patent Application No. P201331825 filed Dec. 13, 2013, each of which are incorporated herein by reference.

FIELD OF THE INVENTION

The present invention is encompassed within the field of renewable energies, and more specifically, in the assembly of a two-bladed vertical axis wind turbine capable of transforming the kinetic energy of the wind into electric energy. Its main characteristic is the low visual impact it produces due to the fact that it can be collapsed and expanded depending on the presence or absence of wind.

BACKGROUND OF THE INVENTION

Today there are many different kinds of wind turbines. According to the rotation axis thereof, they can be separated into two large groups: vertical axis wind turbines and horizontal axis wind turbines. According to the number of blades, they can be catalogued as one-bladed, two-bladed, three-bladed and multi-bladed. According to the type of tower, they can be catalogued as tubular towers or lattice towers. Tubular towers usually have a truncated conical shape and are constituted of metal or a combination of metal and other materials, such as, for example, cement. Lattice towers and similar are constituted of metal only. The combination of all of these groups gives us a broad variety of models, all of them known in the state of the art.

Now, if the novelty of the new wind turbine is focused on the technology of its tower and in the search for specific qualities in terms of the assembly or possibility of collapse thereof, the state of the art is reduced considerably.

Thus, several wind turbines that expand the tower during the assembly thereof are known in the state of the art. Patents EP2161394 and US2007175134 describe two sections of a lattice tower for a wind turbine, which are pivotally connected along a shaft. The lower section is anchored to the ground and the upper section is raised above the lower section once the lower section is secured. The main difference between both inventions is that the European patent self-carries the nacelle and blades during its assembly. However, the solutions described above are aimed at fixed assemblies.

There is another small, collapsible wind turbine which sole purpose is for it to be easily transportable. They are collapsible, small and movable air turbines.

There are no collapse mechanisms in the state of the art applicable to large wind turbine towers because they are all fixed.

DESCRIPTION OF THE INVENTION

The invention relates to a vertical axis wind turbine which main characteristic is to provide it with a metal structure to support it and for said structure to be freely collapsible.

With this wind turbine, the invention solves the structural resistance and stability problems, taking into account that the action of collapse and expansion is the inherent characteristic of the wind turbine, given that it is very often performed.

To achieve the foregoing, a "collapse and expansion" mechanism has been devised with the least number of rotation shafts, 5 in total, which simplifies the collapse and expansion and facilitates the rigidity of the structure once expanded.

In order for the tower to be easily collapsible and expandable, the weight of the parts to be lifted is reduced to a minimum. The entire weight of the machinery (multiplier, generator, power regulator, transformer), which is usually located adjoining the rotor, is transferred to the base.

In order to complete the collapse, a two-bladed vertical axis wind turbine is selected, which blades collapse very easily over the rotor, remaining parallel to the ground.

The simplest system possible has been chosen as a drive mechanism for the collapse and expansion, based on tension cables actuated by motors with reel and pulleys, which gather up or release the cable as required to expand or collapse the wind turbine. In any case, each joint could be motorized, but it would be more expensive.

It is important to ensure the stability and verticality of the wind turbine set during the collapse and expansion. To achieve the foregoing a stabilizing system based on braces and movable guides is provided, which is simple to manufacture and easy to maintain.

The advantages obtained with the collapsible wind turbine, object of this invention, with respect to existing ones are the following.

The visual impact is reduced, given that the visibility thereof decreases by 80% when collapsed, which allows it to be fully hidden easily. If the time of operation, due to the existence of wind, amounts to 50% of the time available as a maximum, the visual impact is reduced by 50%. Out of every 4 days, it would only be seen for 2.

The danger of detachment of any of the parts of the wind turbine is reduced because the exposure of the rotor and tower to excessively strong winds is avoided with the collapse.

As a consequence of the reduction of the visual impact and level of danger, its installation should be allowed near populated areas, thereby reducing losses in the transportation of energy and the cost of transportation networks from wind farms to the points of consumption.

By reducing the weight of the pieces to be lifted, the overturning moment at the base when expanded and in operation is reduced, which leads to a reduction in the size and with it, in the cost of the foundation.

Since a smaller foundation is required, it becomes very suitable for offshore facilities, given that it can float. The cost of the offshore foundation is very high.

The maintenance and exchange of any part of the wind turbine is facilitated, given that all activities are carried out at ground level. In the case of offshore, maintenance and replacements can be carried out at port.

The collapse and expansion implies that the pieces are smaller and less heavy, with which the transportation of the disassembled wind turbine to the installation site and the installation process itself is facilitated, especially in inaccessible places.

In terms of the manufacturing, almost all of its components are single pieces, are easily machined, and are replaceable without molds.

BRIEF DESCRIPTION OF THE DRAWINGS

A series of drawings shall be described below very briefly, which facilitates a better comprehension of the invention and is expressly related to an embodiment of the invention presented as a non-limiting example thereof.

FIG. 5 shows a detail view of the rotor support in an A collapse position A and in a B expansion position.

DETAILED DESCRIPTION OF THE INVENTION

Figure 1:
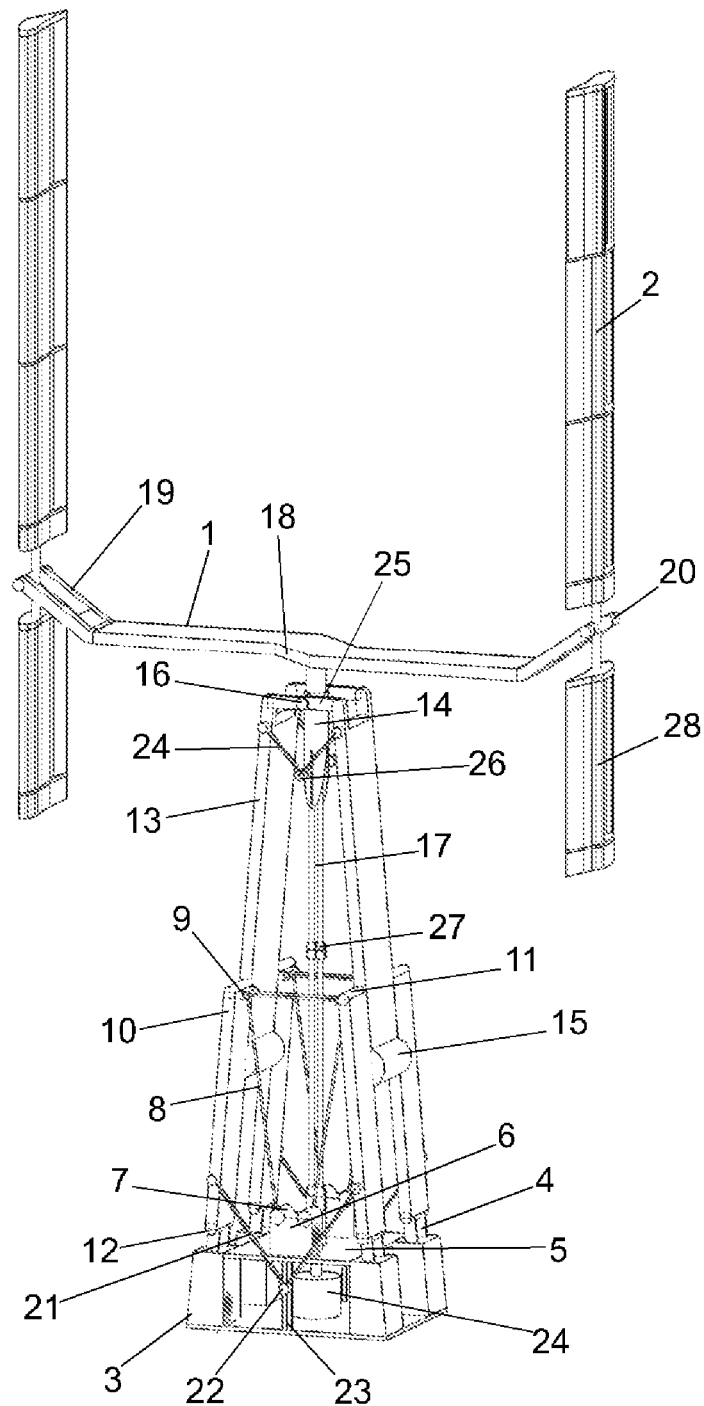
FIG. 1 shows a general view of the fully expanded wind turbine.

As shown in FIG. 1, the rotor (1) and the blades (2) of the wind turbine of the invention are supported on a structure generically qualified as a tower. In this preferred embodiment, the wind turbine is a vertical axis wind turbine and the structure of the tower is formed by a base, supporting arms which main characteristic is that they are collapsible, and an upper part connected to the rotor (1) and the blades (2), which are also collapsible. The base is composed of the foundation, rectangular-shaped piles (3) arranged facing each other, supporting in their upper part supporting hinges (4), with a supporting platform (5) extending between them. Each of the base piles (3) supports a plurality of supporting hinges (4) on which the arms composing the collapsible structure making up the tower are arranged. On the other hand, the platform (5) supports four electric motors (6) associated with reels (7) that wind and unwind a tensioning element (8), which allows the collapse and expansion of the structure. The tensioning element (8) is preferably a metal cable and extends towards pulleys (9) that collaborate in pairs facing each other.

The lower part of the structure making up the tower is formed by a group of arms known as lower supporting arm (10), which extend from the supporting hinges (4) arranged on the piles of the base (3) to a point of rotation where the intermediate rotation shaft (11) is established, at the same height than the pulleys (9). The attachment between the supporting hinges (4) and the lower supporting arm (10) is carried out with a lower rotation shaft or piston rod (12).

The other of the supporting arms of the structure of the tower is known as upper supporting arm (13) and extends from the rotor support (14) to the intermediate rotation shaft (11), being prolonged from this point and introducing the counterweight (15) among the lower supporting arms (10). The upper supporting arm (13) is joined together to the pointed cylinder forming the rotor support (14) by means of the upper rotation shaft (16). Between the rotor support (14) and the base supporting platform (5) extends a drive shaft (17). Said shaft has a first practical embodiment wherein it is composed of two rods with an intermediate point of rotation (27), one at each end. In a second practical embodiment, the drive shaft is a telescopic element.

The rotor (2) is formed by a support crossbeam exhibiting a break (18) at its point of attachment with the drive shaft (17) and an oblique variation (19) at its ends, which trans-form the rigid support crossbeam into a U that houses the blades (1) by means of a motorized shaft (20).

Figure 2:
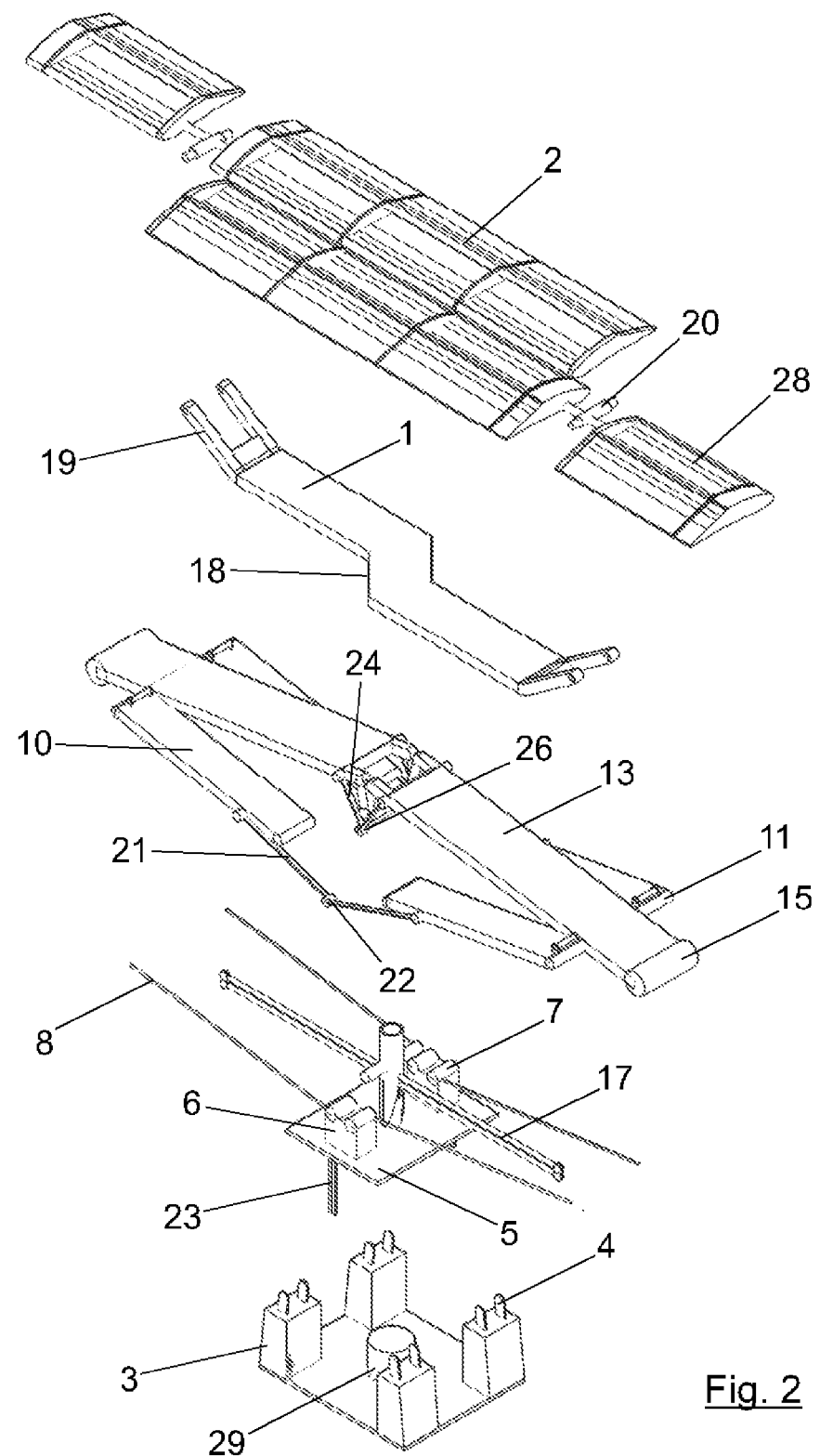
FIG. 2 shows the same view than the preceding figure, with the wind turbine fully collapsed and separated at several levels.
Figure 3:
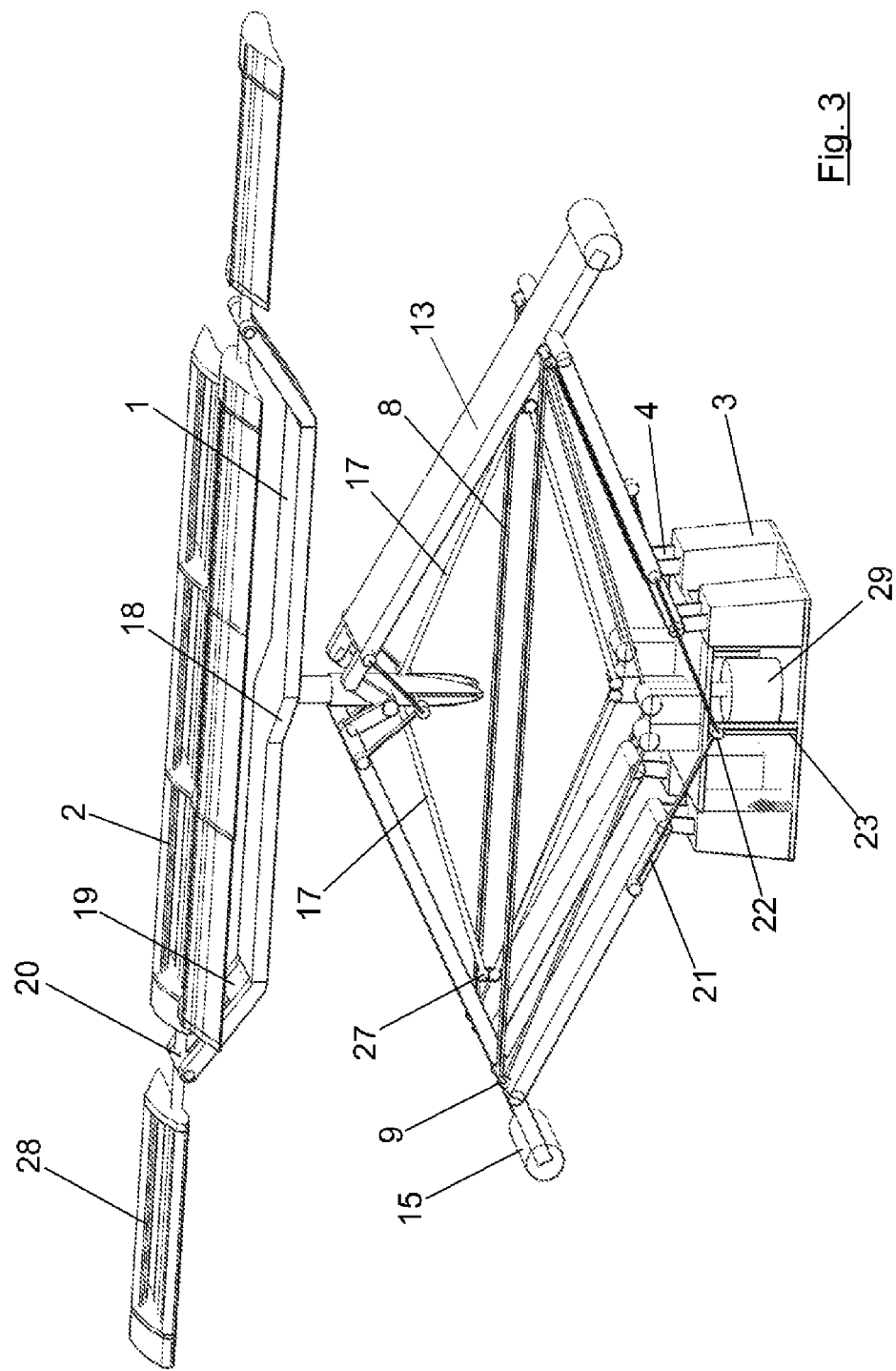
FIG. 3 shows a view with the collapsed rotor and partially collapsed tower.
Figure 4:
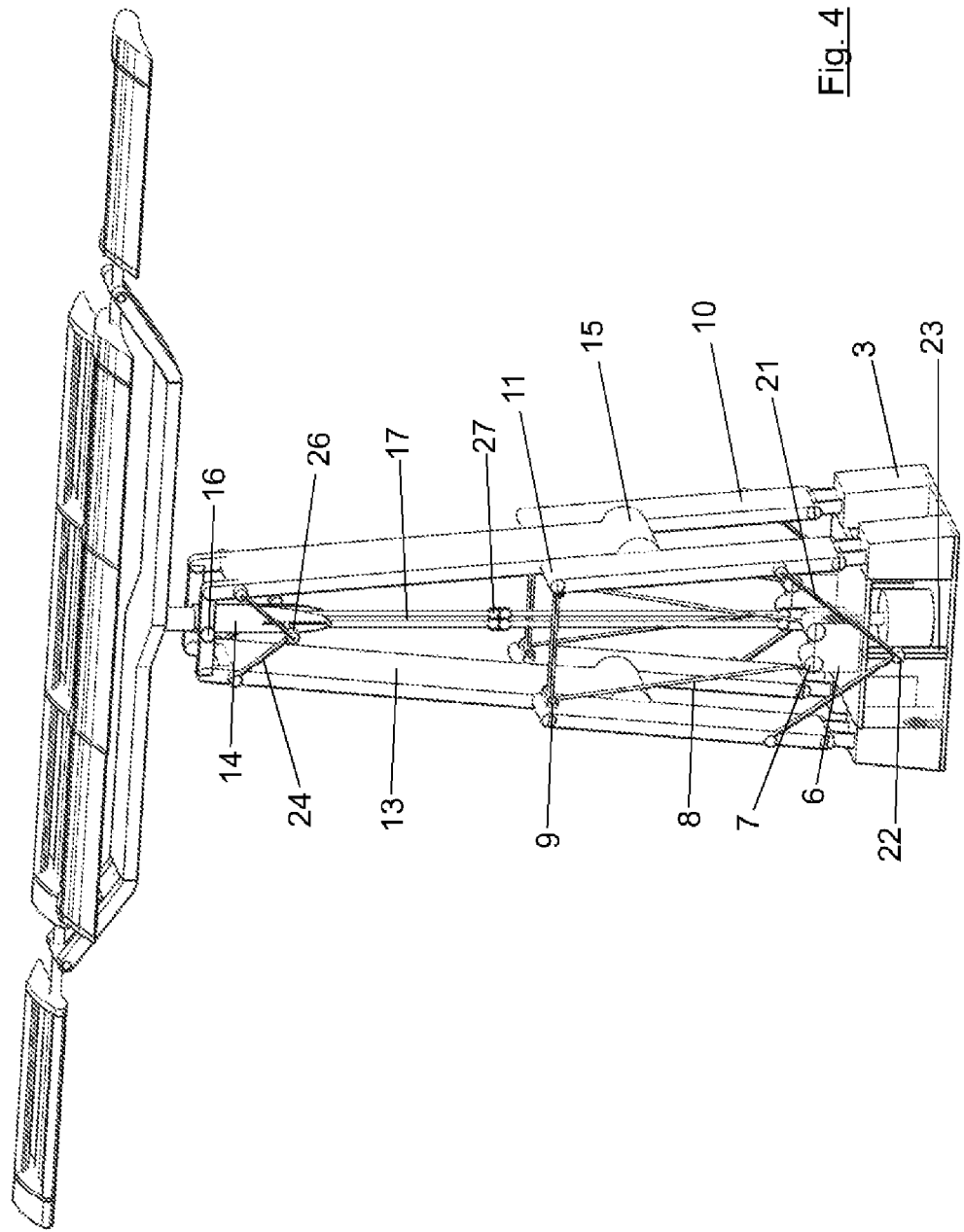
FIG. 4 shows a view with the collapsed rotor and expanded tower.

FIG. 2 shows the wind turbine once the structure composing the wind turbine tower and the part corresponding to the rotor thereof have been collapsed. These two structures and the rest of the elements are shown at different levels. FIG. 3 shows the half-expanded wind turbine and FIG. 4 the fully expanded tower.

The operation of the invention is understood by contrasting FIGS. 1, 2, 3 and 4. Only starting the electric motors (6) located in the supporting platform (5) is required in order to go from the half-collapsed position of FIG. 3 to the erect position of FIG. 4 (and vice versa). The reels (7) begin to gather up the tensioning element (8), thereby expanding the lower supporting arm (10) and the upper supporting arm (13). The lower supporting arm (10) has braces (21) in its lower part, near the lower rotation shaft (12), attached to a sliding guide (22) that moves along a rail formed by two beams (23) arranged between the base piles (3). These braces (7) ensure the verticality of the structure during the expansion process.

On the other hand, the upper supporting arm (13) also has upper braces (24), which secure the verticality of the rotor during the expansion and the final arrangement of the upper rotation shaft (16) and the auxiliary pieces (25) that cooperate with the aforementioned upper rotation shaft (16). The sliding guide (26), corresponding to the upper braces (24), moves along two frontal slots made in the rotor support (14), attached to that of the drive shaft (17) rotating freely in its interior. During the collapse, the bars forming said shaft (17) begin to separate and fold on their intermediate point of rotation (27) and on that of their ends, while the upper ends of the bars are introduced in the slots made in the sides of the pointed rotor support (14). As soon as the collapse reaches its final point, the bars forming the drive shaft (17) engage with the rotor support (14), affixing the same and preventing the movement thereof, constituting the brake of the rotor.

In the case of the expansion, the upper supporting arm (13) enters into contact with the lower supporting arms (10), preventing the rotation between both arms from exceeding the optimal point of rotation. The contact can be made in many ways, by means of a protruding element welded to the lower supporting arms (10) which interferes in the rotation of the upper supporting arm (13), by means of a protruding element welded to the upper supporting arm (13) which interferes in the rotation of the lower supporting arms (10), or by means of a stopper located inside the rotation shaft attaching the lower supporting arms (10) to the upper arm (13).

The collapse of the rotor (1) is achieved with the motorized shaft (20) arranged between the blade (2) and the termination of the piece constituting the rotor (1). Said rotor piece (1) has a break (18) in the center, which provides a gap that makes it possible to collapse both blades (2) without them overlapping or colliding with each other. Likewise, the oblique variation (19) exhibited by its ends is equivalent to the thickness of the blade (2) and makes it possible for it to be supported by the rotor (1) without protruding. The only part that goes beyond the length of the rotor (1) is the counterweight blade (28), which is arranged below the blade (2) itself. The collapse of the rotor and the blades is fully balanced in order to avoid overloading at the base.

Other motorized shafts may be placed at all the points of rotation of the structure of the tower and replace the elevation set comprising the motor (6) to wind/unwind the tensioning element (8).

The electricity-generating elements (29) comprising the generator, multiplier (if required), transformers and voltage cabinets are arranged at the base, between the piles (3) and the supporting beams (23) of the braces (21).

It should be noted that at the base there is a FIG. 30) representing a person, which provides a potential scale to the wind turbine object of the invention.

FIG. 5 shows the rotor support (14), the upper rotation shaft (16), the upper brace (24), the sliding guide (26) and the drive shaft (17) in an A collapsed position and in a B expanded position.

Figure 6:
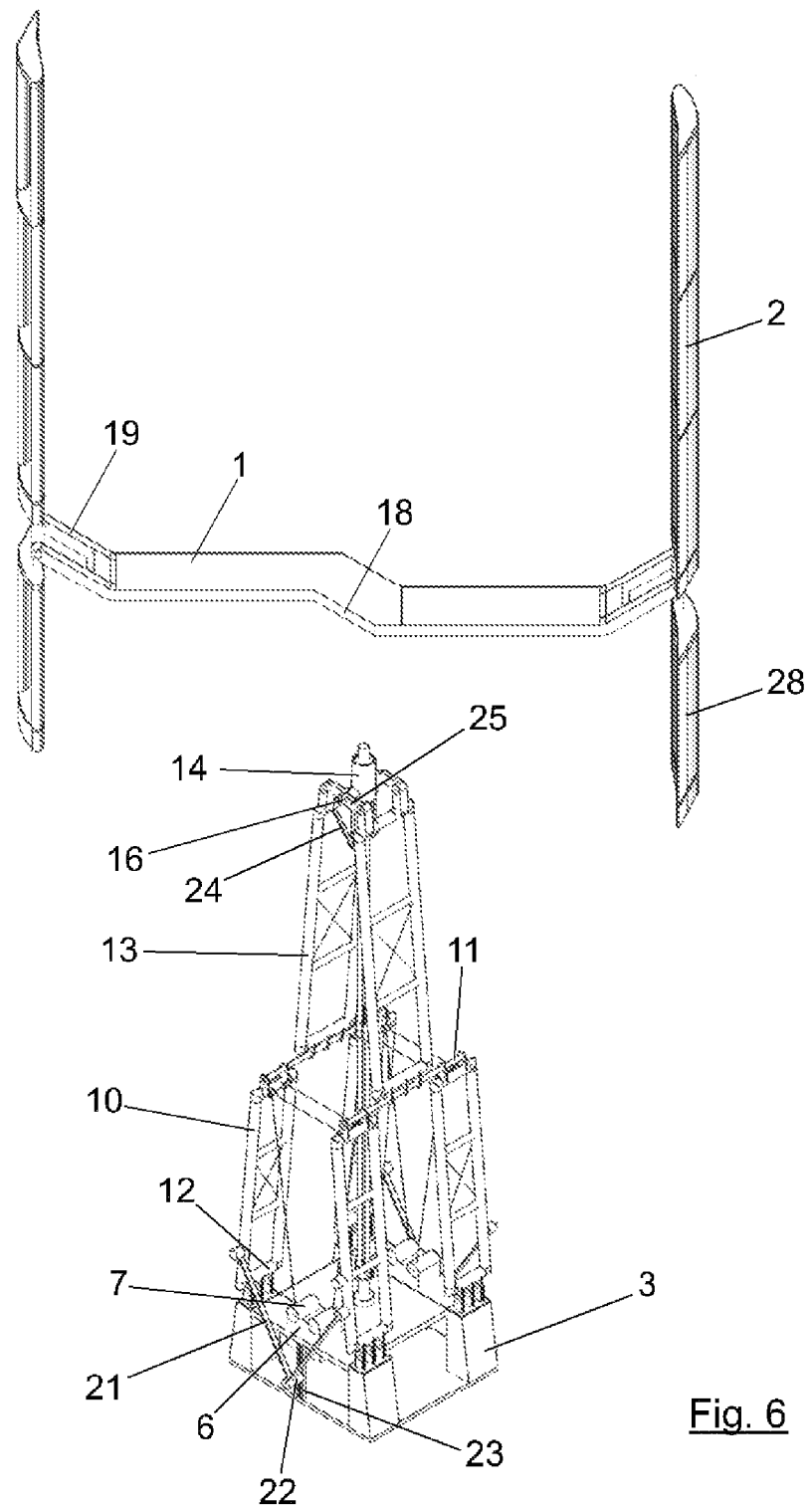
FIG. 6 represents a general view of the fully expanded wind turbine according to a metal lattice embodiment.
Figure 7:
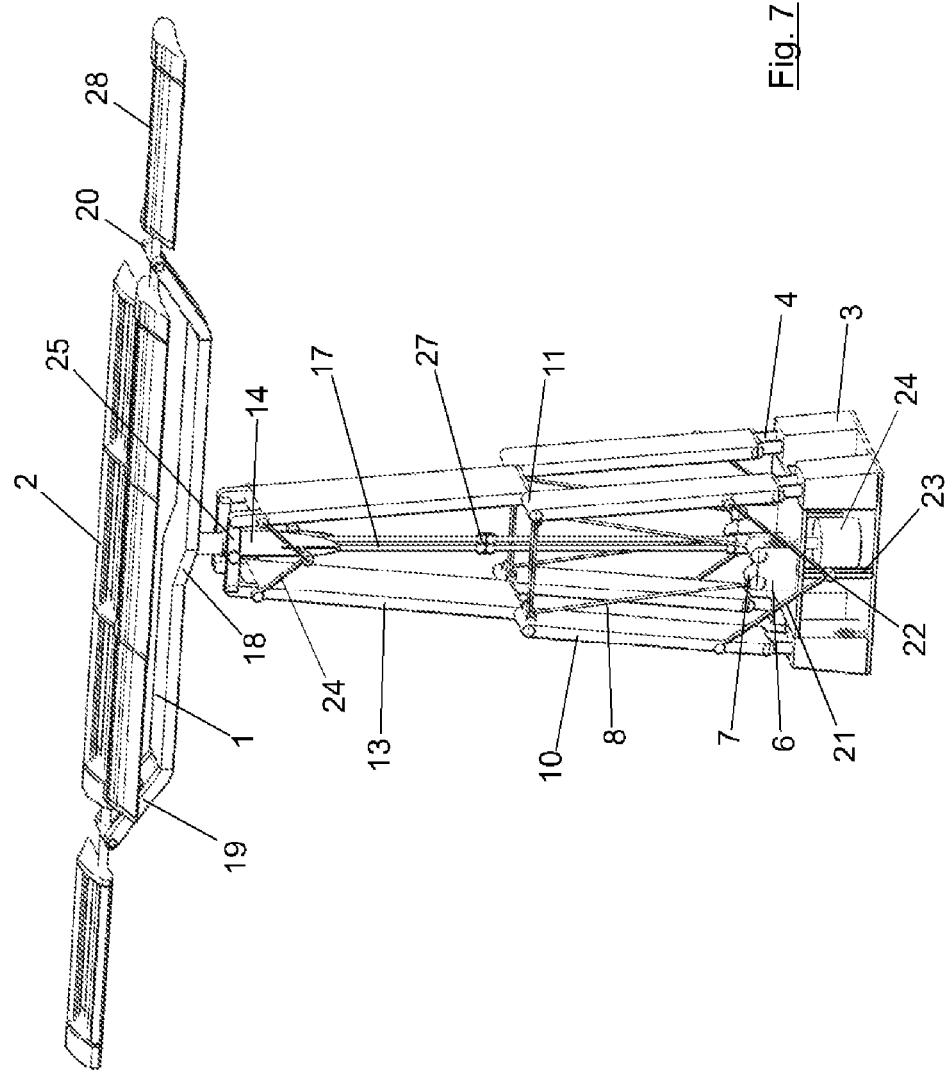
FIG. 7 shows a view with the collapsed rotor and expanded tower according to a solid material embodiment with the arms without counterweights.

In another practical embodiment of the invention shown in FIGS. 6 and 7, the structure corresponding to the arms (10, 13) of the wind turbine tower is constituted by a metal lattice. Also according to this embodiment, the termination of the upper arm (13) ends at the same level than the termination of the lower arm (10).

The invention claimed is:

1. Vertical axis wind turbine, comprising:
   a collapsible structure formed by: a base attached to a plurality of lower arms by means of lower rotation shafts, and a pair of upper arms attached by means of an upper rotation shaft to a rotor support and by means of respective intermediate rotation shafts to the lower arms,
   an elevation set with a plurality of motors to wind/unwind a plurality of tensioning elements attached to the lower arms,
   a collapsible drive shaft attached to the rotor support and to electricity-generating means and
   a collapsible rotor attached to the rotor support and formed by blades attached to a rotor bar by means of motorized shafts, wherein the plurality of the lower arms consists of two pairs of arms and each of these arms comprises, in a lower area, braces that run, by means of a sliding guide, through a rail formed by respective beams, and each upper arm has braces in an upper end that run, by means of a sliding guide, through a slot of the rotor support.

2. The wind turbine according to claim 1, wherein each arm of the pair of upper arms
   extends from the rotor support to the intermediate rotation shaft coinciding with the termination of the lower arms;
   is joined together to a pointed cylinder forming the rotor support by means of the upper rotation shaft and auxiliary rotation pieces; and
   is affixed to the lower arm.

3. The wind turbine according to claim 2, wherein the upper arm extends from the rotor support to the intermediate rotation shaft, prolonging beyond this point and introducing a counterweight in the termination of the lower arms, entering into contact therewith and preventing the rotation between both arms from exceeding the optimal point of rotation.

4. The wind turbine according to claim 1, wherein a platform is supported on a number of piles forming a base having an interior space, and the plurality of electric motors move reels wind/unwind the plurality of tensioning elements, such that the reels collaborate with pulleys arranged at the upper part of the lower arms, supporting hinges being erected on the platform, which, by means of the lower rotation shafts, support the lower arms.

5. The wind turbine according to claim 4, wherein the platform is traversed by the drive shaft, and electricity-generating elements attached to said drive shaft are arranged in the interior space of the base.

6. The wind turbine according to claim 1, wherein the drive shaft is formed by collapsible bars which separate and fold at an intermediate point of rotation, while upper ends of the collapsible bars are introduced in slots on sides of the rotor support so as to lock in place the collapsible bars and preventing movement of the collapsible bars thereby, constituting a brake of the rotor.

7. The wind turbine according to claim 1, wherein the rotor is formed by a support crossbeam exhibiting a break at a point of attachment with the drive shaft and an oblique variation at its ends.

8. The wind turbine according to claim 1, wherein the upper arm and the lower arm is composed of a solid metal block.

9. The wind turbine according to claim 1, wherein the upper arm and the lower arm is composed of a metal lattice.

* * * * *